United States Patent [19]

Smith et al.

[11] 4,033,605
[45] July 5, 1977

[54] INTEGRAL TORSION BAR — STRUT FRONT SUSPENSION SYSTEM

[75] Inventors: Robert H. Smith, Rochester; Howard L. Benford, Bloomfield Hills, both of Mich.

[73] Assignee: Chrysler Corporation, Highland Park, Mich.

[22] Filed: Nov. 7, 1975

[21] Appl. No.: 630,130

[52] U.S. Cl. .................... 280/664; 267/57; 280/695; 280/700; 280/723
[51] Int. Cl.² ........................... B60G 11/18
[58] Field of Search .......... 280/695, 700, 721, 664; 280/723; 267/57, 154

[56] References Cited

UNITED STATES PATENTS

| | | | |
|---|---|---|---|
| 2,245,809 | 6/1941 | Olley | 280/721 |
| 3,027,177 | 3/1962 | Karlstad | 280/695 |
| 3,033,587 | 5/1962 | Perish | 280/695 |
| 3,037,789 | 6/1962 | Allison | 280/695 |
| 3,054,625 | 9/1962 | Haley | 267/57 |
| 3,218,053 | 11/1965 | Shreve | 267/57 |
| 3,245,492 | 4/1966 | Herr | 267/57 |
| 3,400,945 | 9/1968 | Sampietro | 267/57 |
| 3,432,158 | 3/1969 | Goodwin | 267/57 |
| 3,894,602 | 7/1975 | Von der Ohe | 267/57 |
| 3,944,246 | 3/1976 | Kolbe | 280/695 |
| 3,992,036 | 11/1976 | Allison | 280/695 |

FOREIGN PATENTS OR APPLICATIONS

1,456,804   9/1965   France ........................ 280/700

*Primary Examiner*—Joseph F. Peters, Jr.
*Assistant Examiner*—John A. Carroll
*Attorney, Agent, or Firm*—Talburtt & Baldwin

[57] ABSTRACT

Front wheel suspension apparatus for a motor vehicle having a frame member which includes side rails on opposite sides thereof extending generally longitudinally of the vehicle, the apparatus having a cross member extending across the space between said side rails, rubber insulated connectors connecting said cross member to said rails, an upper control arm and a lower control arm pivotally connected to said cross member at each side thereof, wheel support structure connected to each set of upper and lower control arms. Two torsion bar and strut members connect the lower control arms to the cross member. Each torsion bar and strut member includes a forearm portion extending from the adjacent lower control arm forwardly and an elongated and inwardly transversely extending torsion bar portion.

19 Claims, 10 Drawing Figures

INTEGRAL TORSION BAR — STRUT FRONT SUSPENSION SYSTEM

BACKGROUND OF THE INVENTION

This invention relates to a wheel suspension system for motor vehicles, and more particularly to an integral transversely extending torsion bar – strut suspension system for independently supporting the front wheels of a motor vehicle.

Each front wheel of most motor vehicles is conventionally suspended from the vehicle frame by means of an upper control arm and a lower control arm which extends laterally from the frame and are pivotally connected thereto on generally longitudinally extending axes. A knuckle extends between the outer ends of the control arms and is universally mounted thereon by ball joints or the like. The wheel is mounted on a spindle extending outwardly from the knuckle. A spring is provided between the frame and the lower control arm to resiliently support the wheel in relation to the vehicle. This spring may take various shapes, but one type is a conventional coil spring extending upwardly from the lower control arm. Another type includes an elongated torsion bar which extends from the pivot point of the lower control arm rearwardly and longitudinally of the vehicle to a connection with the vehicle frame. Another form of torsion bar suspension included bars extending transversely of the vehicle and connected either to the lower control arm at the pivot point thereof or to a link connected to the knuckle. To prevent longitudinally directed thrusts on the wheel from undue pivoting of the control arm assembly about a vertical axes, a strut may extend between the lower control arm and the frame at a point forwardly of the control arm assembly. In the past, some of these springs and struts have been isolated from the vehicle frame and body of various types of insulators. This invention is directed to an improved suspension system which is unique in construction and which provides improved ride qualities.

BRIEF SUMMARY OF THE INVENTION

Briefly, this invention comprises suspension apparatus for the front wheels of an automotive vehicle having a frame, said apparatus comprising control arm means for supporting the wheels at opposite sides of said frame, and spring members connected to one end to said control arm means and at the other end to said frame, said spring members extending across said vehicle and adapted to be torsionally deflected upon movement of said wheels in a generally vertical direction.

Another object of this invention is to provide a wheel suspension system of the class described which provides a smooth relatively harsh-free ride.

A further object of this invention is to provide a wheel suspension system such as described which gives the occupants an improved ride with a relatively low sound level.

Another object of this invention is to provide a suspension system of the type described wherein vibration from the road and wheels is minimized.

Still a further object of this invention is to provide a wheel suspension system of the class described which inhibits twisting of the control arm in a generally horizontal direction, as well as providing improved spring characteristics.

A further object of this invention is to provide a wheel suspension system of the type described having a height adjustment which may be conveniently reached and operated.

Still another object of this invention is to provide a wheel suspension system of the class described in which the suspension spring components are isolated from the frame and body.

Another object of this invention is to provide a suspension system of the class described in which components are unlikely to be damaged from rocks and other debris thrown up by the wheels as the vehicle moves over such objects.

Another object of this invention is to provide a wheel suspension system which allows a control arm to rotate relative to a torsion bar member to which the arm is attached.

Another object of this invention is to provide a wheel suspension system such as described which minimizes fight between two connected members which pivot on different axes.

Another object of this invention is to provide a wheel suspension system such as described which does not inhibit the placement of items, such as a catalytic converter, in an under body location.

A further object of this invention is to provide a suspension system such as described which is simple and economical in construction and efficient in operation.

Other objects and advantages will be made apparent as the description progresses.

BRIEF DESCRIPTION OF THE DRAWINGS

Referring now to the drawings, in which one of various possible embodiments are illustrated.

Like parts are indicated by corresponding reference numerals throughout the several views of the drawings.

DESCRIPTION OF THE PREFERRED EMBODIMENT

Figures 1, 7, 8:
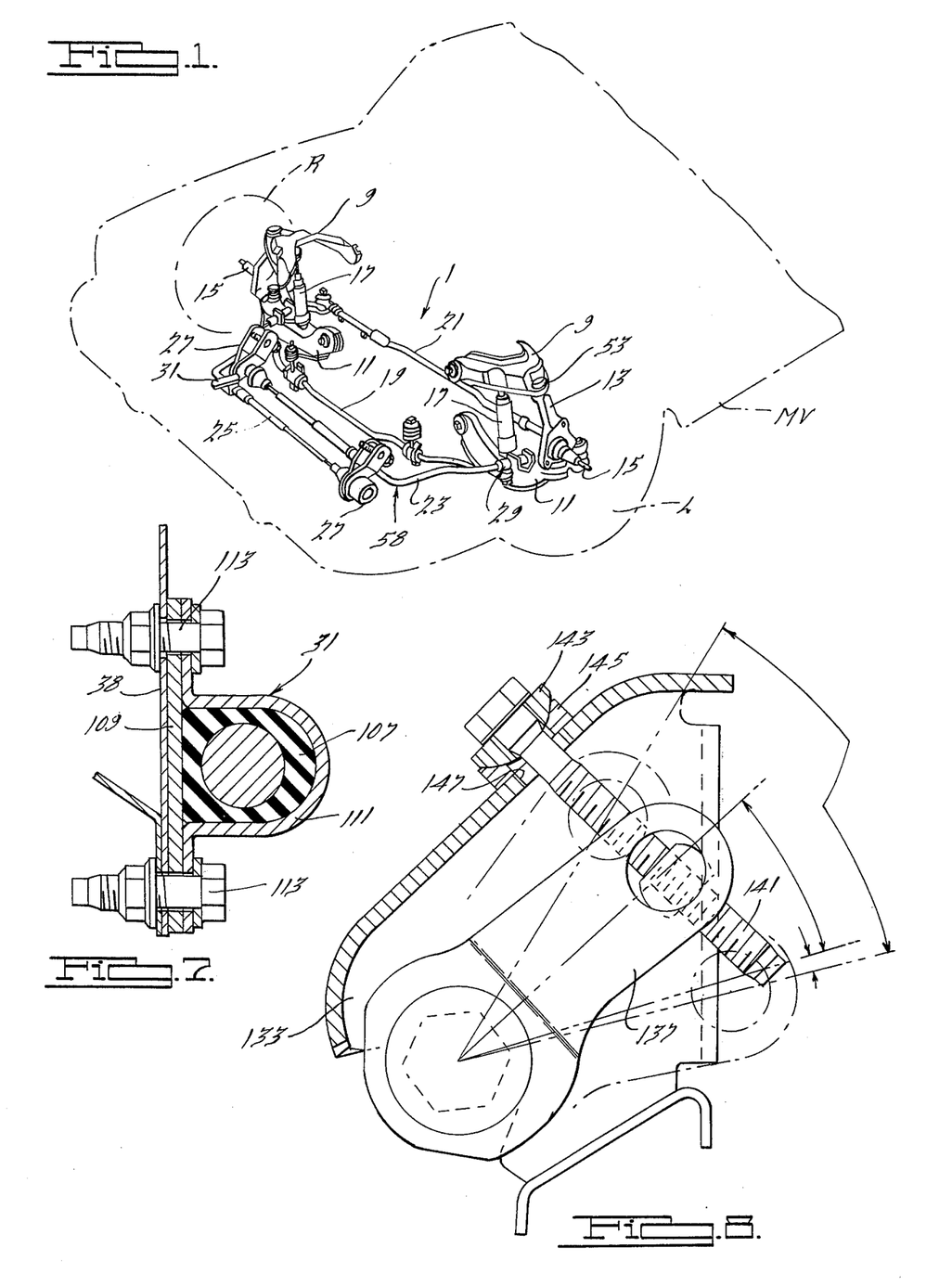
FIG. 1 is a perspective view illustrating a wheel suspension apparatus constructed in accordance with this invention, the vehicle in which the apparatus is installed being shown in broken lines.
FIG. 7 is an enlarged section taken along line 7—7 of FIG. 4.
FIG. 8 is an enlarged section taken along line 8—8 of FIG. 5.
Figure 2:
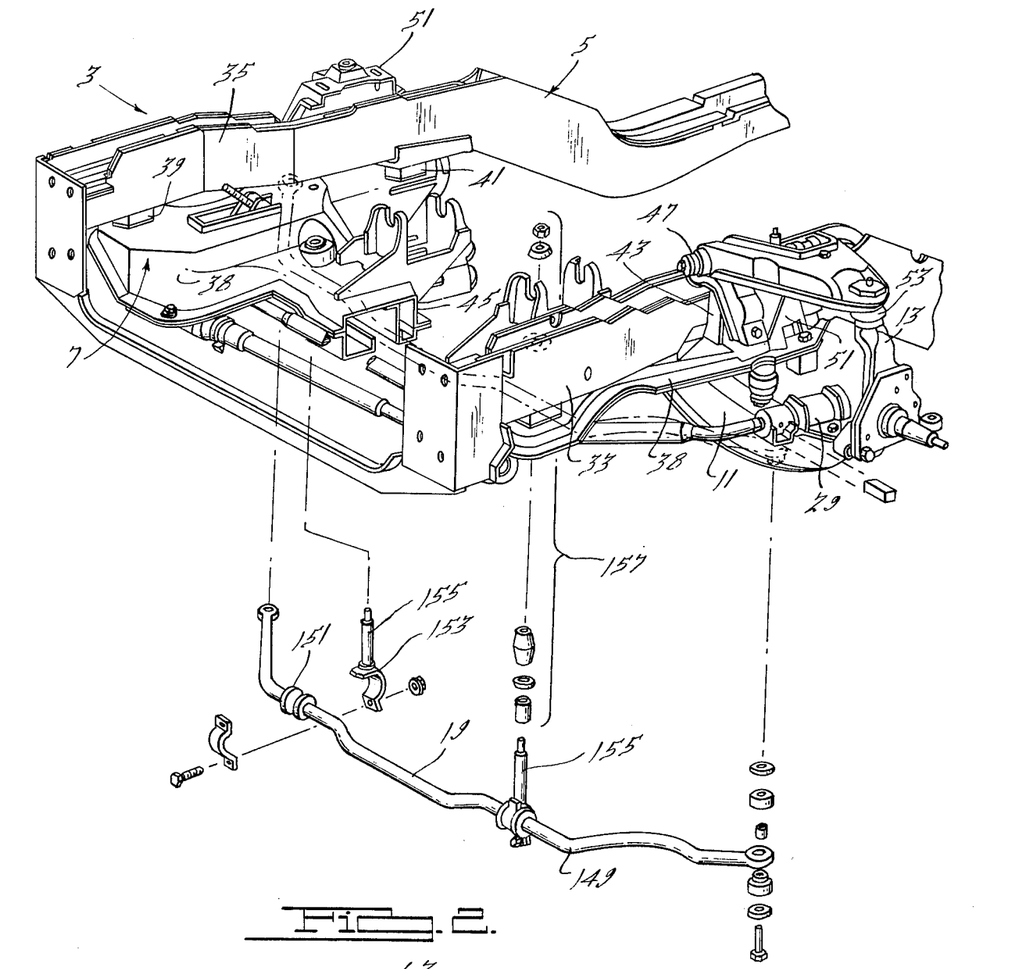
FIG. 2 is a fragmentary perspective view of the apparatus of this invention, certain parts being removed for clarity.

Referring now to the drawings, a suspension system for the front wheels L and R of a motor vehicle MW is shown generally by the reference numeral 1 in FIG. 1. The suspension system 1 is adapted to be connected to a front end assembly 3 (FIG. 2) which includes a forestructure assembly or frame 5 and a cross member assembly 7. Suspension system 1 (FIG. 1) basically includes upper and lower control arms 9 and 11 for each wheel. A knuckle 13 is connected to the control arms and has spindle 15 on which the respective wheel is mounted. A shock absorber 17 extends between the lower control arm and the cross member 7. Extending generally between the lower control arms is a sway bar 19 which is secured in two places to the cross member 7. A suitable steering linkage 21 is connected to each of the knuckles 13 for turning the latter with respect to the control arms. Finally, torsion and strut bars 23 and 25 extend forwardly from a respective lower control arm and then transversely below the cross member 7 across the vehicle to an adjustable anchor 27. The torsion and strut bars are connected by insulating devices 29 and 31, described more fully hereinafter, to the lower control arms and to the cross member 7.

Referring now to the more detailed aspects of the invention, the frame 5 includes side rails 33 and 35 which extend longitudinally of the vehicle and are joined at their rearward ends by a rear cross member 37 extending transversely across the vehicle. The cross member 7 has two side portions 38 (FIG. 3) secured by rubber insulated connectors 39 and 41 to the side rails 33 and 35 and has upstanding portions 43 outside the rails. The cross member 7 is thus connected to, but isolated from the frame 5. A transverse connector portion 45 extends between side portions 38 of member 7.

Figure 3:
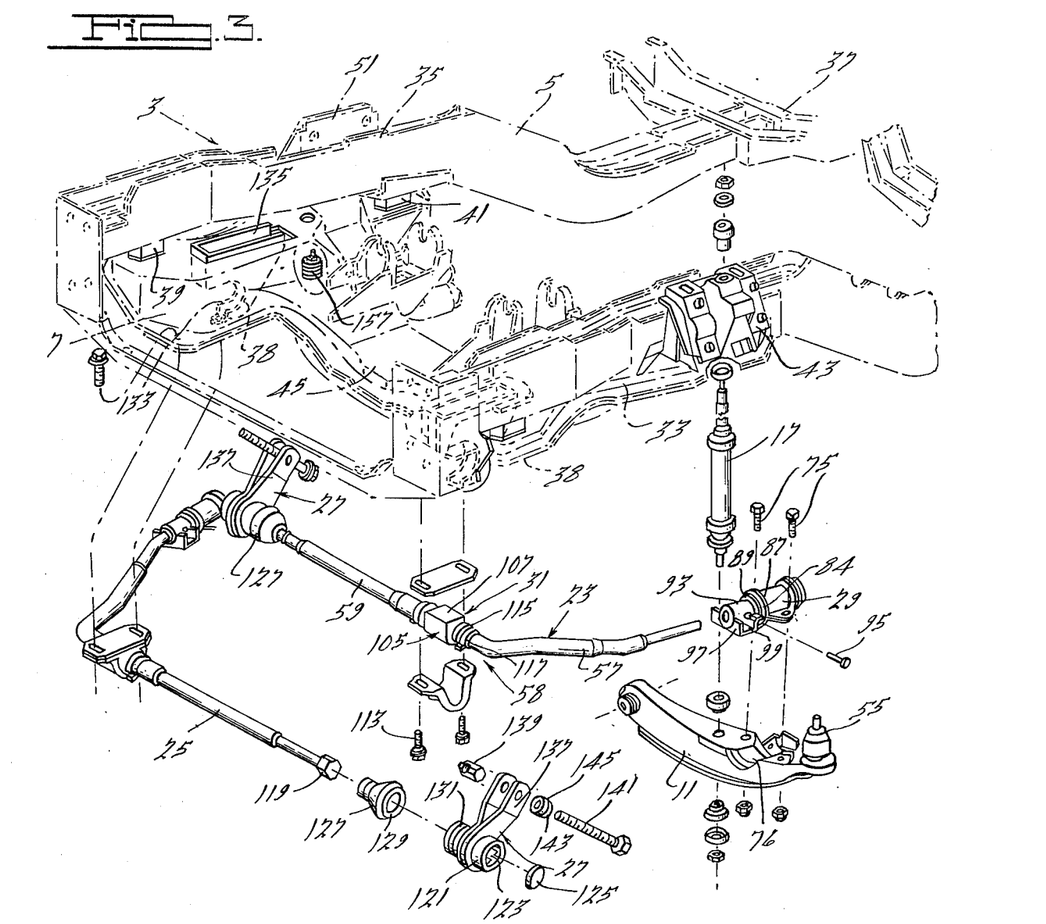
FIG. 3 is an exploded fragmentary view similiar to FIG. 2, some parts being shown in broken lines for clarity.
Figure 4:
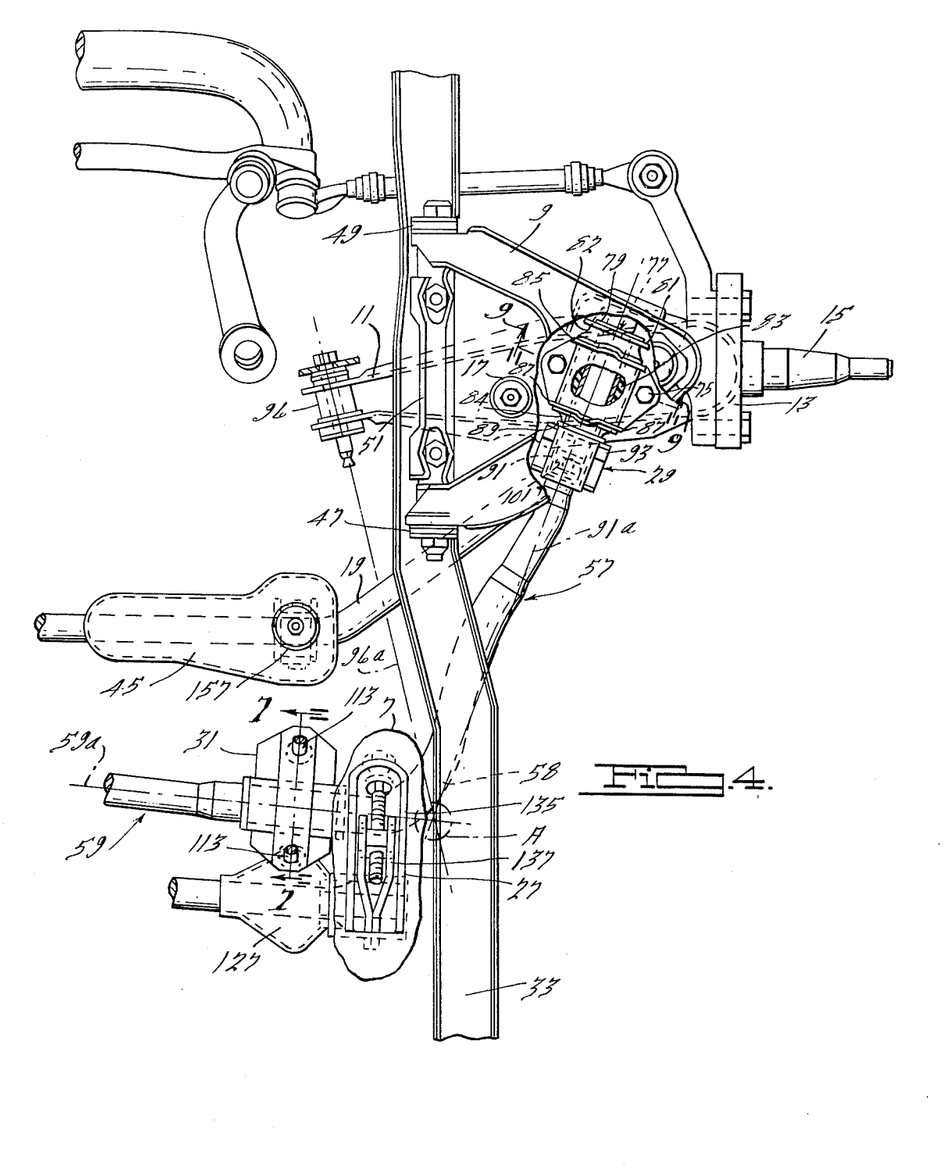
FIGS. 4 and 5 are plan views of the left and right side, respectively, suspension components of this invention, certain parts being broken away for clarity.
Figure 5:
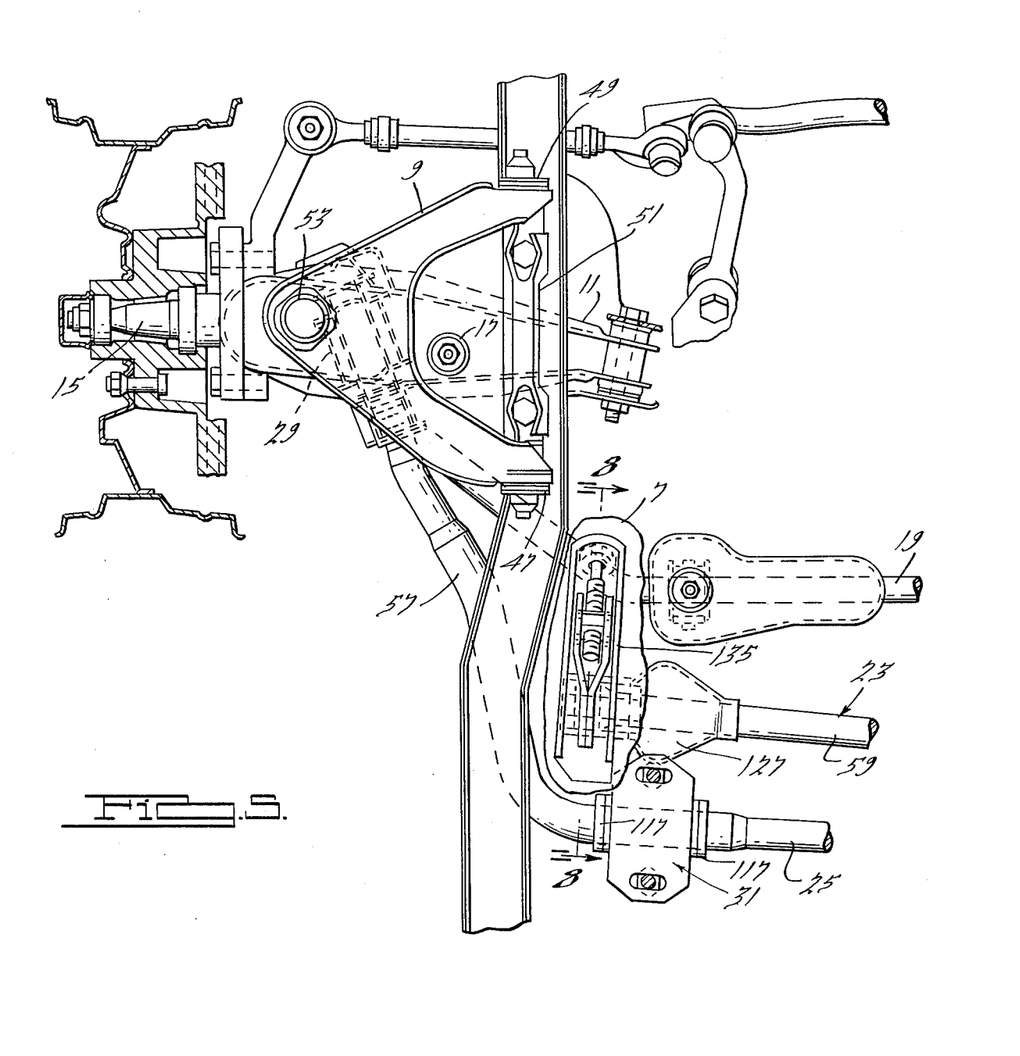

Each upper control arm 9 is pivotally connected at 47 and 49 (FIGS. 4 and 5) to a support bracket 51 secured to the respective upstanding portion 43 (FIG. 3). The upper end of each knuckle 13 is connected by a ball joint 53 to the outer end of the respective upper control arm. The knuckles are connected to the outer ends of the lower control arms by ball joints 55.

Torsion bar and strut devices 23 and 25 are generally similar in construction, and a detailed description of one, such as bar 23, will suffice for both. Bar 23 is generally elbow-shaped and has a forearm strut portion 57 which extends forwardly and inwardly from the lower control arm. The bar has a transversely extending torsion portion 59 which also extends rearwardly slightly toward the adjustable connector 27 from the elbow 58. Both forearm portion 57 and torsion portion 59 have a plurality of shoulders between the elbow of the bar and the ends of the bar so that the portions 57 and 59 have a stepped increase in diameter from their ends to the elbow.

Figure 9:
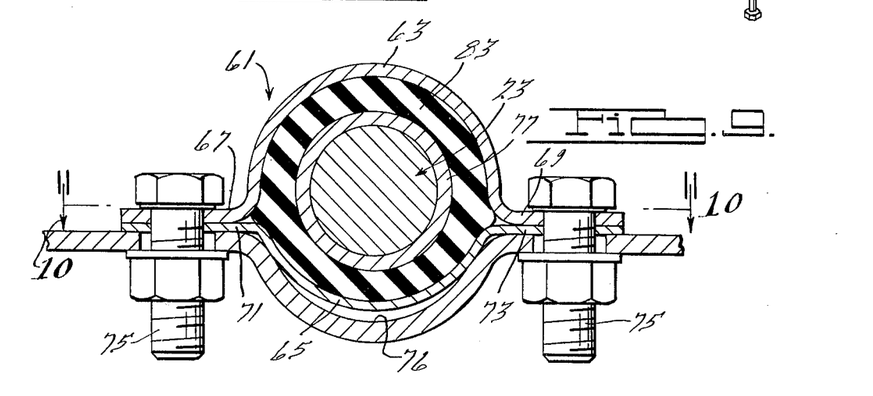
FIG. 9 is an enlarged section taken along line 9—9 of FIG. 4.

The insulating connecting device 29 which connects the rearward end of the torsion and strut bar 23 to the lower control arm includes a split cylindrical sleeve 61 (FIG. 9) formed of two generally semi-cylindrical plates 63 and 65 having laterally extending flanges 67, 69, 71 and 73. The flanges have mating holes through which fasteners 75 extend for securing the connector 29 to the lower control arm which, as will be seen in FIG. 9, has a generally semi-cylindrical recess or well 76 into which the semi-cylindrical portion 65 extends.

The rearward end of bar 23 is received within a tubular metal sleeve 77 (FIG. 10) having a flared end 79 which has an enlarged end plate or washer 81 welded thereto on forward side of the flare. Sleeve 77 has a rubber insulating sleeve 83 molded thereon. Sleeve 83 has rubber flanges 82 and 84 which are respectively compressed between the washer 81 and a flange 85 on the rearward end of sleeve 61 and between a flange 87 on the forward end of sleeve 61 and an annular flange 89 and a sleeve 91 of a strut-connecting bracket 93.

Figure 10:
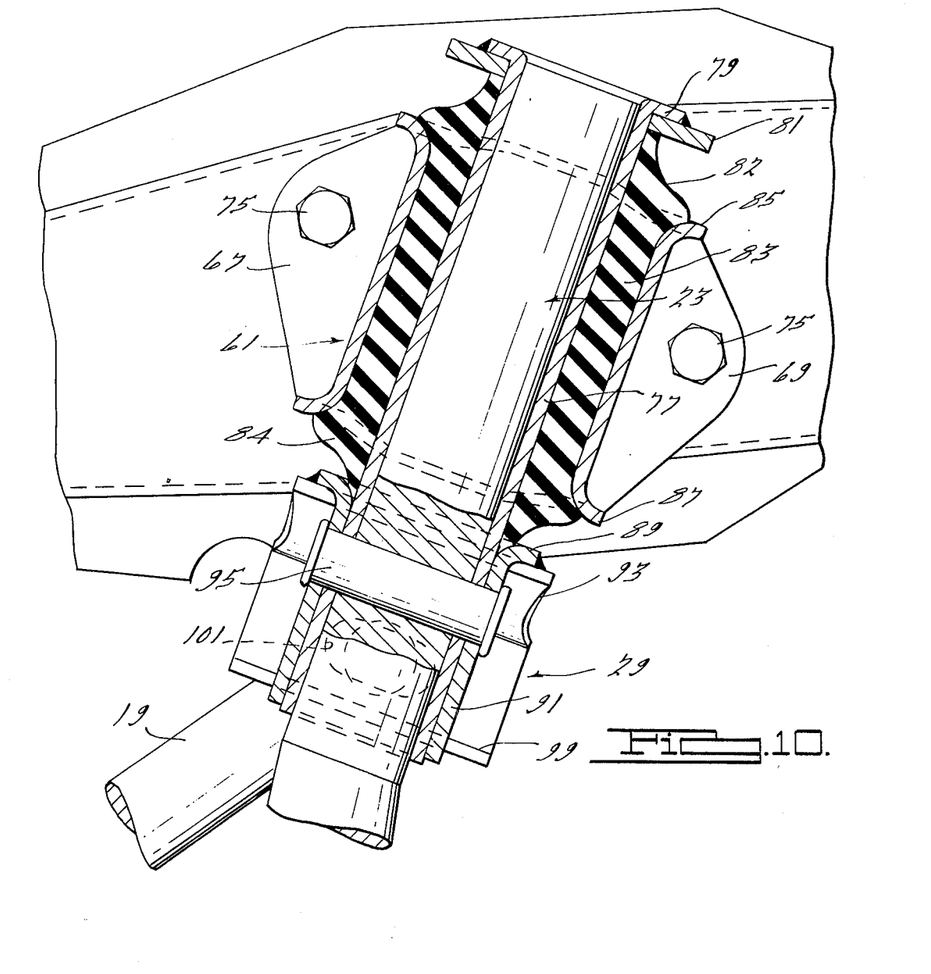
FIG. 10 is an enlarged section taken generally along line 10—10 of FIG. 9.

Sleeve 91 is secured to the bar 23 in a predetermined position by a pin 95 which extends through sleeve 91, sleeve 77 and the bar. Thus, the bar is securely anchored to the lower control arm, yet is completely insulated from the arm by the rubber sleeve 83 and its flanges 82 and 84.

The axis of the end of the torsion bar 23 and sleeve 91, the axis of pivot connection 96 (FIG. 4) of the lower control arm and the axis around which the torsion portion 59 twists are located so that all three intersect or nearly intersect at the same point or near to one another. As shown, vertical planes in which the axes 91a, 96a and 59a are located, intersect one another within a circled area A. Locating the axes in this manner minimizes the fight which exists between two members joined together, but pivoting on different axes.

Figure 6:
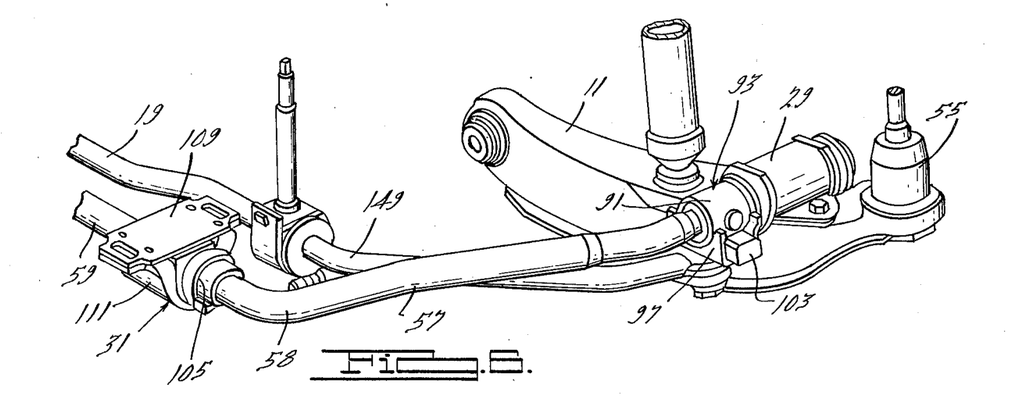
FIG. 6 is an enlarged fragmentary perspective of FIG. 1.

Welded to the lower portion of sleeve 91 is a generally U-shaped bracket 97 having a trough or track 99 (FIG. 3) which extends transversely with respect to the center axis of the bar 23 as it passes through the sleeve 77. The track 99 has an elongated opening or slot 101 therein extending parallel to the track. The rearward end of the sway bar 19 is attached to bracket 97 by a fastener which extends up through the sway bar and a slot 101 into a threaded opening in a slideable rectangular nut 103 (FIG. 6). The slot 101 and nut 103 allow for a limited adjustment of the nut in track 99 as the bar 19 is attached to the bar 23 during assembly of the vehicle.

At a point immediately adjacent the elbow 58 on the torsion portion 59 the insulating device 31 connects the bar 23 to the connector portion 38 of the cross member 7. Device 31 includes a rubber bushing 105 having a passage therein through which bar 23 passes. Bushing 105 has an enlarged portion 107 having an external side and lower surface which is generally U-shaped and a flat upper surface which is compressed against a connector plate 109 by a generally U-shaped bracket 111 secured to the connector plate and connector portion 45 by fasteners 113. Sleeves 115 extend outwardly from enlarged portion 107 and are sealed to the bar 23 to prevent moisture penetration by clamps 117. Thus, the bar 23 is secured to cross member 7, but is resiliently insulated therefrom by the device 31.

The end of the torsion portion 59 is connected to the cross member by the adjustable anchor 27. The end of portion 59 has a hexagonal head 119 (FIG. 3) which mates with a sleeve 121 having a hexagonal passage 123 therein. An end plug 125 closes the outer end of passage 123 while a tubular seal 127 having a bar 129 on its outer end located in an annular recess 131 on the inner end of sleeve 121 extends from the sleeve inwardly to the bar 23.

The sleeve 121 is cradled in a saddle 133 (FIG. 8) formed on the lower end of a bracket 135 secured to cross member 7 and extending downwardly through rectangular openings therein. A bifurcated arm 137 is welded to sleeve 121 and extends upwardly between the walls of bracket 135. A cross pin 139 extends between and is rotatably mounted in the outer ends of the two fingers of bifurcated arm 137.

An elongated adjusting bolt 141 extends through a first washer 143 having a convex face and a second washer 145 having a concave face mating with the convex face and through an opening 147 in a rear wall of bracket 135 into threaded engagement with the pin 139. By turning the adjusting bolt 141 the arm 137 is swung in one direction causing the end of the torsion bar to rotate in the same direction. As will be understood the height of the cross member, and hence the vehicle body, is adjusted by turning the adjusting bolt 141. The suspension heights must be held to a certain specification to provide the most satisfactory ride, the correct desired appearance, the proper front wheel alignment and the minimum tire wear.

The torsion and strut bar 25 is generally similar to bar 23. However, as will be apparent, the forearm portion 57 of bar 25 is longer than the forearm portion 57 of bar 23. Also, the torsion portion 59 of bar 25 extends transversely and forwardly from the elbow 58. Although these two torsion bars vary slightly in lengths and direction, the two bars can be made to provide generally equivalent spring rates by variations in the diameter of the bars, and the locations of the shoulders thereon. The diameter of the torsion bar 23 at the elbow may be slightly larger than the diameter of bar 25 at its elbow to compensate for differences in the length of the forearm portion, for example.

The sway bar 19 (FIG. 2) extends forwardly and inwardly from each bracket 97 to an elbow 149 and then transversely across the vehicle. At points spaced inwardly from each elbow the bar 19 extends through a rubber bushing or sleeve 151 held by a two piece clamp 153. A stud 155 extends upwardly from clamp 153 into a rubber isolated connection 157 with cross member 7.

In operation it will be understood that a rearwardly directed force on a wheel will tend to cause the control arms to pivot on a general vertical axes located at their connection points to the cross member 7. The bars 23 and 27, however, are resiliently connected to the lower control arms at 29 and to the cross member 7 at 31 and oppose such rearward swinging movement of the control arms.

As a wheel receives an upwardly directed force, the forearm portion 57 of the respective bar 23 or 25 will swing upwardly placing the torsional stresses on the torsion portion of said bar as the bar tends to pivot about the central axes of the torsion portion. The bar opposes the upward movement of the wheel to provide the desired spring effect. The rubber bushing 107 will twist with the portion of the bar 23 or 25 to which it is attached as the bar itself is twisted. The upward swinging movement of lower control arm 11 causes the rearward end of the torsion and strut member 23 to rotate slightly relative to the arm. This rotation is permitted by the rubber sleeve 83.

It will be seen that all of the suspension components are connected to the front cross member 7 which is itself isolated by insulators 39 and 41 from the frame 5. Thus, any noise and vibrations which may be transmitted by the suspension components are all directed into the front cross member 7. None are transmitted directly to the frame 5 either at the forward portion thereof or at the rearward portion 37 thereof. Hence, the noise and vibrations are isolated at the front of the vehicle.

It will also be seen that the torsion bar suspension assembly leaves space rearwardly of the wheels free and clear of components, thus allowing such space to be used for other components such as a catalytic converter, for example. Moreover, the bars 23 and 25 combine the functions of a torsion bar with the function of a strut into one element, the portions of which rotate during jounce and rebound being connected only to the cross member 7 through rubber bushings and control arms. Furthermore, the bars are located forwardly of the vehicle wheels, thereby minimizing the likelihood that stones thrown up by the wheels will impinge on the bars.

The sway bar 19 is also insulated from the cross member at 157 to inhibit the transmission of vibration and noise to the cross member. As will be understood the sway bar minimizes vehicle roll during cornering.

In view of the foregoing, it will be seen that the several objects and other advantages of this invention are achieved.

Although only one embodiment of the invention has been disclosed and described, it is apparent that other embodiments and modifications of the invention are possible.

I claim:

1. Front wheel suspension apparatus for a motor vehicle having a frame member which includes side rails on opposite sides thereof extending generally longitudinally of the vehicle, said apparatus comprising a cross member extending across the space between said side rails, means resiliently and insulatingly connecting said cross member to said rails, a lower control arm pivotally connected to said cross member at each side thereof, wheel support means connected to each of said lower control arms, and two torsion bar and strut members, each torsion bar and strut member comprising a forearm portion extending from the adjacent lower control arm forwardly and inwardly, an elongated transversely extending torsion bar portion, and an elbow integrally connecting said forearm to one end of said torsion bar portion, means resiliently and insulatingly connecting the rearward end of said forearm to said lower control arm, a resilient and insulating connecting joining said torsion bar portion to said cross member inwardly of said elbow, and adjustable means connecting the end of said torsion bar portion to said cross member at the side thereof opposite the lower control arm to which the torsion bar and strut member is connected, said adjustable means being adapted to rotate the end of the torsion bar and strut member to which it is attached for adjusting the height of the cross member relative to the surface on which the vehicle is located.

2. Front wheel suspension apparatus as set forth in claim 1 wherein said means resiliently and insulatingly connecting the rearward end of said forearm to said lower control arm comprises a first sleeve surrounding the end of said forearm, a second resilient insulating sleeve surrounding said first sleeve, and a third sleeve surrounding said resilient sleeve and compressing the latter against said first sleeve.

3. Front wheel suspension apparatus as set forth in claim 2 wherein said resilient and insulating connection joining each torsion bar portion to said cross member includes a resilient sleeve surrounding said torsion bar portion, the axes of rotation for said torsion bar portion and said lower control arm and the axes of rotation of the end of the torsion bar and strut member relative to said third sleeve to which it is attached approximately intersecting one another at the same approximate point.

4. Front wheel suspension apparatus as set forth in claim 1 wherein said adjustable means includes a sleeve having a non-circular passage which mates with a non-circular end of said torsion and strut member, a bracket secured to said cross member and cradling said sleeve of said adjustable means, an adjusting arm secured at one end to said sleeve, and means for adjusting the location of said other end of said arm for rotating the end of said torsion and strut member.

5. Front wheel suspension apparatus as set forth in claim 1 wherein said resilient and insulating connection joining said torsion bar portion to said cross member includes a resilient bushing surrounding said torsion bar portion, tubular extensions located at opposite ends of said bushing, clamps securing said tubular extensions to said torsion bar portion, said bushing having a side and lower surface which is generally U-shaped and a generally U-shaped clamp securing said bushing to said cross member.

6. Front wheel suspension apparatus as set forth in claim 2 wherein said resilient and insulating connection joining the torsion bar portion to said cross member includes a resilient sleeve surrounding said torsion bar portion.

7. Front wheel suspension apparatus as set forth in claim 2 wherein said adjustable means includes a sleeve having a non-circular passage which mates with a non-circular end of said torsion and strut member, a bracket secured to said cross member and cradling said sleeve of said adjustable means, an adjusting arm secured at one end to said sleeve, and means for adjusting the location of said other end of said arm for rotating the end of said torsion and strut member.

8. Front wheel suspension apparatus as set forth in claim 3 wherein said adjustable means includes a sleeve having a non-circular passage which mates with a non-circular end of said torsion and strut member, a bracket secured to said cross member and cradling said sleeve of said adjustable means, an adjusting arm secured at one end to said sleeve, and means for adjusting the location of said other end of said arm for rotating the end of said torsion and strut member.

9. Front wheel suspension apparatus as set forth in claim 2 wherein said resilient and insulating connection joining said torsion bar portion to said cross member includes a resilient bushing surrounding said torsion bar portion, tubular extensions located at opposite ends of said bushing, clamps securing said tubular extensions to said torsion bar portion, said bushing having a side and lower surface which is generally U-shaped and a generally U-shaped clamp securing said bushing to said cross member.

10. Front wheel suspension apparatus as set forth in claim 1 wherein one of said torsion bar and strut members extends rearwardly slightly from its elbow to its adjustable end, said other torsion bar and strut member extending forwardly slightly from its elbow to its adjustable end.

11. Front suspension apparatus as set forth in claim 1 wherein said torsion and strut members are circular in cross section, the diameter of each member being largest in the region of said elbow and becoming progressively smaller from said elbow to each of its ends in a series of annular steps.

12. Front suspension apparatus as set forth in claim 1 wherein at least one of said torsion bar and strut members extends slightly in a longitudinal direction with respect to said vehicle from its elbow to its adjustable end.

13. Front suspension apparatus as set forth in claim 12 wherein said means resiliently and insulatingly connecting the rearward end of said forearm to said lower control arm comprises a first sleeve surrounding the end of said forearm, a second resilient insulating sleeve surrounding said first sleeve, and a third sleeve surrounding said resilient sleeve and compressing the latter against said first sleeve.

14. Front suspension apparatus as set forth in claim 13 wherein said resilient and insulating connection joining the torsion bar portion to said cross member includes a resilient sleeve surrounding said torsion bar portion.

15. Front suspension apparatus as set forth in claim 14 wherein said adjustable means includes a sleeve having a non-circular passage which mates with a non-circular end of said torsion and strut member, a bracket secured to said cross member and cradling said sleeve of said adjustable means, an adjusting arm secured at one end to said sleeve, and means for adjusting the location of said other end of said arm for rotating the end of said torsion bar and strut member.

16. Suspension apparatus for the front wheels of an automotive vehicle comprising a frame, said frame comprising side rails and a cross member extending between said side rails at the front end thereof, an upper control arm and a lower control arm pivotally connected to said cross member on both sides of said vehicle, wheel support means pivotally connected between an upper control arm and a lower control arm on each side of said vehicle, wheels mounted on said wheel support means, first and second suspension members connecting said lower control arms to said cross member, each suspension member comprising a one-piece member having a strut portion and a torsion bar portion, each of said strut portions extending forwardly from the respective lower control arm, an elbow connected to the forward end of each strut portion, each of said torsion bar portions extending transversely of said vehicle from said elbow towards an opposite side of said vehicle, first connector means resiliently and insulatingly connecting the rearward end of each strut portion to said lower control arm, second connector means resiliently and insulatingly connecting each of the torsion bar portions adjacent the elbow of the respective suspension member to said cross member, means for rotatably supporting the free end of said suspension members adjacent said cross member, and means for rotating said free ends of said suspension members for adjusting the height of said cross member relative to the surface on which the vehicle is located, each of said first connector means comprising a first sleeve surroundng the end of the respective strut portion, a resilient sleeve surrounding said first sleeve, and an outer sleeve surrounding said resilient sleeve and compressing the latter against said first sleeve.

17. Suspension apparatus as set forth in claim 16 wherein one of said suspension members extends rearwardly slightly from its elbow to the adjustable end, the other suspension member extending forwardly slightly from its elbow to its adjustable end.

18. Suspension apparatus as set forth in claim 17 wherein each of said suspension members is largest in the region of its elbows and becomes progressively smaller toward each end in at least one stepped reduction.

19. Suspension apparatus for the front wheels of an automotive vehicle having a frame, said apparatus comprising control arm means for supporting the wheels at opposite sides of said frame, and spring members connected at one end to said control arm means and at the other end to said frame, said spring members extending across said vehicle and adapted to be torsionally deflected upon movement of said wheels in a generally vertical direction, each of said spring members comprising a generally L-shaped arm having one of the portions thereof extending from an elbow rearwardly toward said control arm means, and the other portion thereof extending from said elbow across said vehicle, each of said portions becoming progressively smaller from said elbow to the end thereof and adjustable means connecting the end of said other portion of each of said spring members to said frame at the side thereof opposite the control arm means to which said one portion of the respective spring member is connected said adjustable means being adapted to rotate the ends of the spring members to which they are attached for adjusting the height of the frame relative to the surface on which the vehicle is located.

* * * * *